Patented Feb. 10, 1953

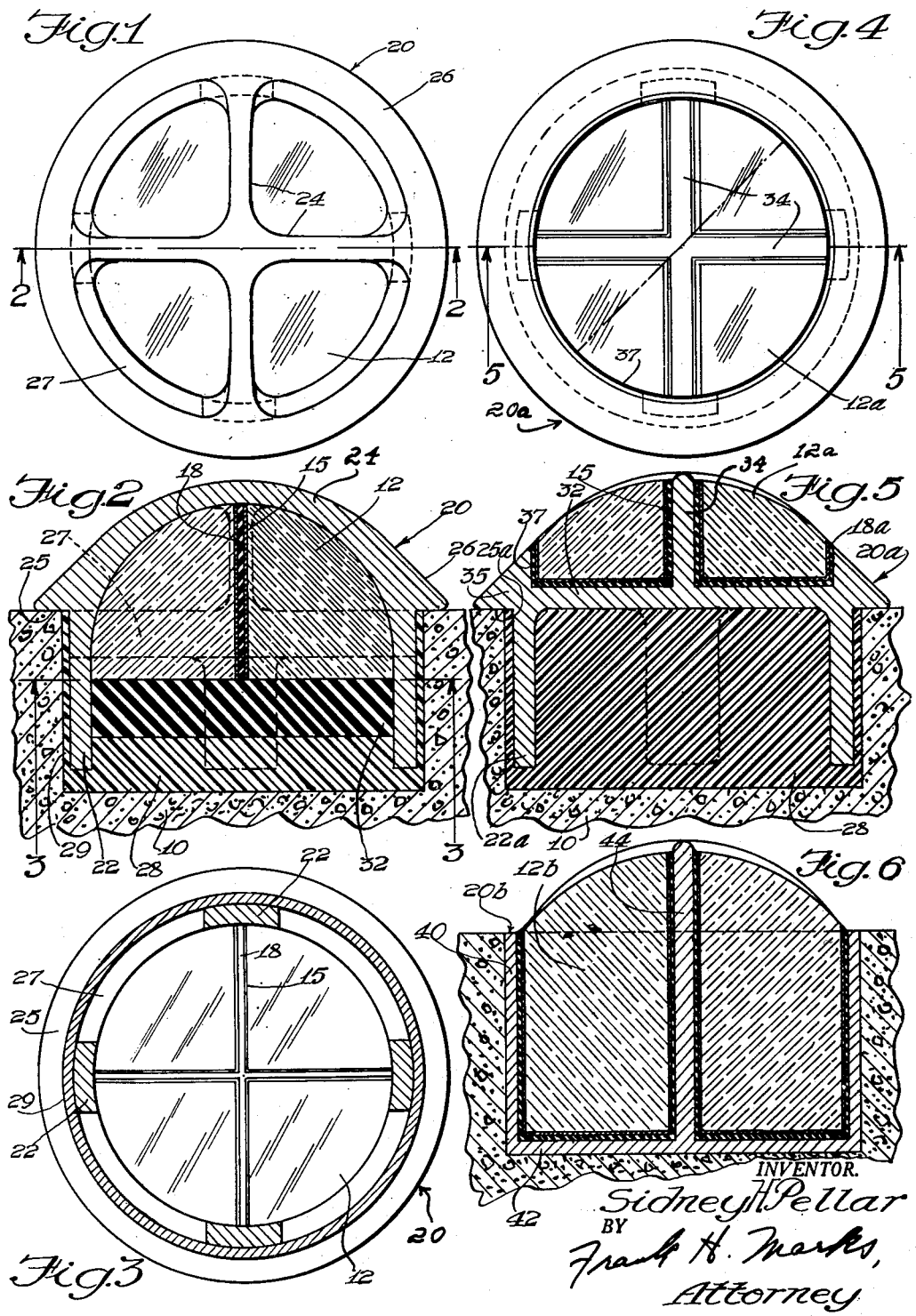

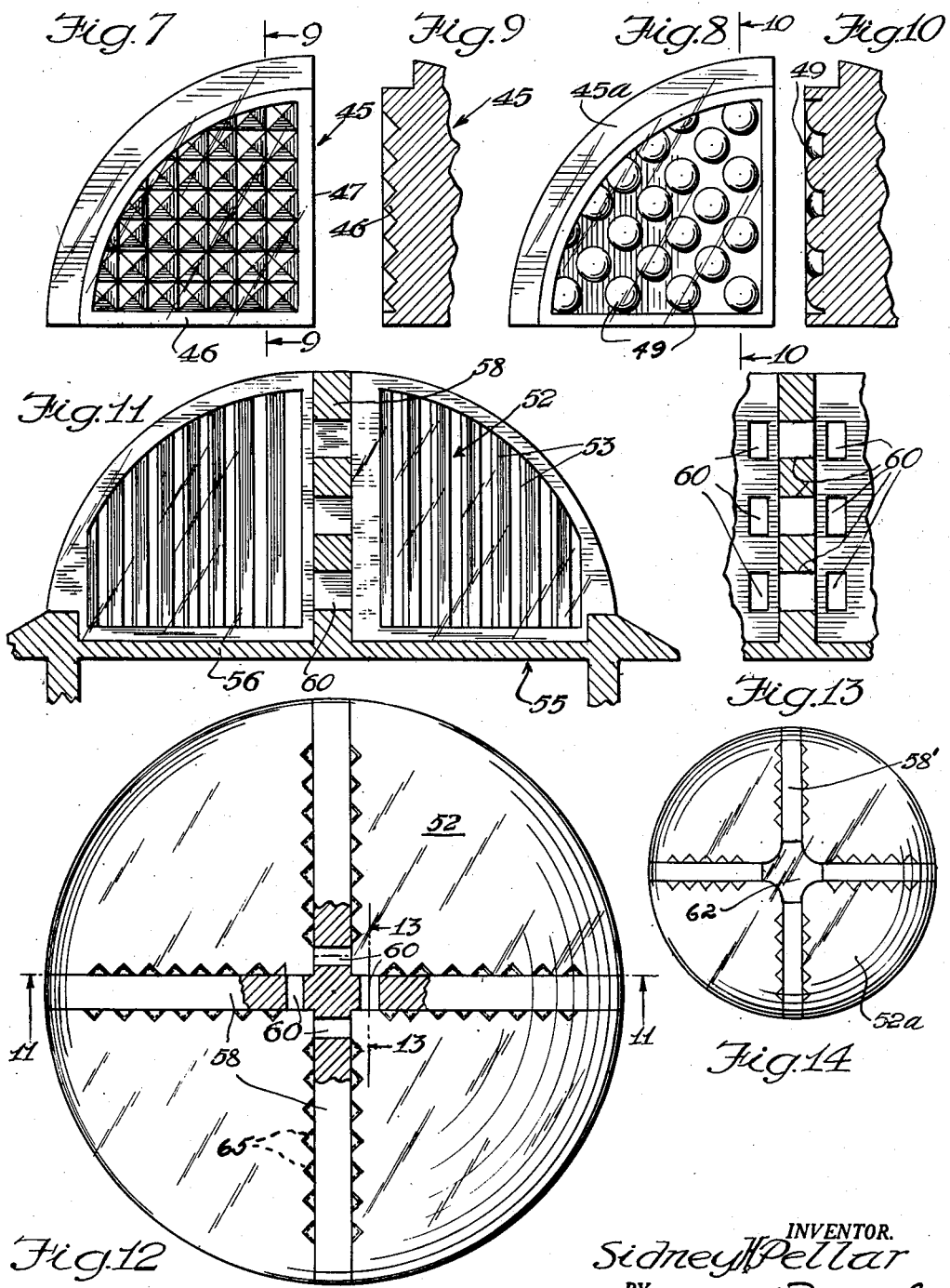

2,627,784

UNITED STATES PATENT OFFICE 2,627,784

ROAD TRAFFIC SIGNAL

Sidney H. Pellar, Wheaton, Ill.

Application June 29, 1949, Serial No. 102,069

14 Claims. (Cl. 88—79)

My invention relates to road traffic signals of the type consisting of pluglike elements designed to be embedded in a road for the purpose of imparting a signal to automotive traffic, such as approach to an intersection, curves, turnout, etc. In a sense, this invention may be considered an improvement over that covered by my Patent No. 2,489,499, granted November 29, 1949.

As in my said copending application, the present invention contemplates a pluglike device designed to be embedded in a road and formed of glass or other transparent or translucent material, so as to have optical properties, and also preferably deformed so as to have below the exposed surface thereof elements for optically affecting light falling thereon, as by reflection, refraction, etc., in order that traffic approaching an intersection from one direction, especially at night, but also in daytime, may have a light signal imparted thereto.

My invention also contemplates a sectional multicolored signal, imparting a scintillating jewellike effect.

I also provide in conjunction with the molded pluglike element above referred to an improved casing or housing for the same, so that it will be supported within the pavement and protected from wear and destruction against heavy traffic loads passing thereover. The housing is specially designed to permit passage of light from one lens element to another.

My invention will be more clearly understood from the appended drawings forming a part of this specification and illustrating certain preferred embodiments of my invention, wherein:

Fig. 1 is a top plan view of one form of my invention;

Fig. 2 is a sectional view taken substantially along the line 2—2 of Fig. 1;

Fig. 3 is a section taken substantially along the line 3—3 of Fig. 2;

Fig 4 is a plan view similar to Fig. 1 but showing another embodiment of my invention;

Fig. 5 is a sectional view taken substantially along the staggered line 5—5 of Fig. 4;

Fig. 6 is a sectional view similar to Figs. 2 and 5 but showing a different form of my invention;

Figs. 7 and 8 are elevational views showing two forms of lens sections comprising part of my invention;

Figs. 9 and 10 are sectional views taken substantially along the lines 9—9 and 10—10, respectively, of Figs. 7 and 8;

Fig. 11 is an elevational view showing a different form of signal device, with a mounting therefor shown fragmentarily in section, said view being taken substantially along the line 11—11 of Fig. 12;

Fig. 12 is a plan view of the device shown in Fig. 11;

Fig. 13 is a fragmentary sectional view of the housing taken substantially along the line 13—13 of Fig. 12; and Fig. 14 is a plan view of still another form of my invention.

Referring first to the embodiment shown in Figs. 1–3, inclusive, numeral 10 represents the paving material of a road in which is embedded a signal device embodying my invention. In the embodiment shown here, the signalling device comprises a plurality of lens elements 12 molded of glass or other suitable translucent or transparent material, either colorless or colored, as desired. The various elements may vary in color within the same unit. The signalling device is preferably formed in a plurality of sector shaped sections each of which, in the embodiment shown, is in the form of a quadrant of an approximate hemisphere. Obviously, the shape and number of the sectors are not critical, my principal concern being that the top is curved and comparatively low, so that it will project above the ground only a slight distance, permitting traffic to roll thereover without too much of a jar, while at the same time projecting sufficiently to impart a beam of light for a substantial distance to approaching motorists. It will be obvious that I am not limited to any particular number of sectors but may use a smaller or larger number of elements 12.

It is my desire that the signalling devices be preferably formed in a plurality of such elements rather than as a single element for a number of reasons. In the first place, they are designed to have certain optical properties, as I shall describe below; furthermore, by forming them of a plurality of sections, damage to one section may be readily repaired by replacing said section at less labor and expense than would be required if the entire signalling device had to be replaced, as would be the case if it were formed in one piece. Furthermore, as stated above, the lens sections may be of different colors, or a combination of colored and uncolored or water white sections, giving added brilliance.

The elements 12 are formed with substantially vertical abutting faces which may or may not be deformed from a generally vertical plane. In the forms shown in Figs. 1–6, inclusive, these faces are substantially flat and preferably have applied thereto a coating 15, which may be in the form of silvering applied to the surface in a manner customary in the silvering of mirrors and the like, or it may be a thin foil or sheet of metal such as tin, aluminum, etc., having high reflectivity. As another alternative, these faces may have applied thereto a coating of phosphorescent or luminescent paint or the like. Also, semi-transparent mirror coatings may be used.

Also interposed between the elements 12 is a separator in the form of a gasket like member 18 formed of rubber or suitable synthetic resin so as substantially to fill the spaces between the elements 12, serving to prevent the entry of dirt, water, etc., and also to protect the lens elements against damage from surface pressures.

The single unit formed by the plurality of elements 12 and associated parts, as above described, is preferably mounted in a casing 20 comprising an anchoring portion adapted to be embedded in the pavement which may consist of a plurality of vertical legs 22, although said anchoring part might be a depending ring. Integrally formed with the anchoring part is a plurality of webs 24 which overlie the junctures of the respective elements 12 and the spacers 18. The legs 22 and webs 24 are joined by a ring having a relatively flat and approximately horizontal undersurface 25 providing a shoulder seating against the surface of the pavement 10, the upper portion of the ring having a gentle slope 26 which merges into the top surface of the elements 12, so that a vehicle riding over the device will avoid any sudden jar. Connecting the legs 22 below the flange 25—26 is a ring 27.

It will be seen from Fig. 2 that the housing 20 is shaped so as to conform closely to the outer contours of the signalling elements 12 so that they will be securely retained therein along with their gasket spacers 18.

Although the device just described may be mounted in any suitable or convenient manner in the road, I prefer, after providing a suitable aperture in the pavement, to insert first within said aperture a suitable mastic or adhesive 28, such as asphalt, tar, pitch or other suitable material which forms not only the bed for the signalling element, but also extends upwardly as at 29 around the fingers 22 of the spider 20. Furthermore, in order to reduce the shock of heavy loads on the signalling device, I may provide above the bed 28 a disk 32 of suitable resilient material such as rubber or synthetic resin.

It will be seen that I have provided a practical and rugged element having a number of advantages. The various sectors 12 making up the signal device or plug have light reflecting and refracting properties, as in my other patent application referred to above, the light which enters these translucent or transparent sectors being bent and reflected in various directions by means of the flat reflecting surfaces where the various sectors abut one another. Furthermore, the casing 20 serves to protect the signalling unit over the abutting planes of the sectors so as more efficiently to prevent entry of foreign matter and also to protect them from chipping as a result of outside pressures along these edges. Said housing also aids in mounting the device in the pavement quickly and with a minimum of labor, and also serves effectively as an anchor to retain the signalling device in the pavement despite heavy pressures which may be applied from the top, as from heavily loaded trucks.

Referring now to the embodiment of Figs. 4 and 5, here again the signalling element comprises a plurality of transparent or translucent sectors $12^a$ which are generally similar to the elements 12, previously described, except that they are of somewhat shallower height. In this embodiment, I have shown the sectors $12^a$ as provided not only on their side but also on their bottom surfaces with a reflecting coating 15, while gaskets $18^a$ are likewise provided adjacent said coatings.

The housing indicated generally by the numeral $20^a$ is of somewhat different form than that provided in Figs. 1-3. In this case said housing comprises legs $22^a$ and also an integral base or platform 32, having integral cross arms 34 as well as a peripheral flange portion 35. Flange 35 provides a flat horizontal portion $25^a$ seating against the surface of the pavement and also an inner shoulder 37 which cooperates with the webs 34 and platform 32 to provide pockets for the sectors $12^a$.

The device is mounted in the pavement 10 similarly to the other embodiment, a suitable bedding material 28 having adhesive qualities being preferably provided.

Fig. 6 shows another embodiment with a different type of mounting. In this case the mounting $20^b$ consists of a cylindrical casing 40 having a bottom wall 42 and vertical partitions 44 forming pockets for lens sectors $12^b$.

The embodiment of Fig. 6 has the advantage of simplicity of construction so that it can be made with a minimum of labor and reduced expenditure for tools.

It should be understood that while in the devices of Figs. 1-6, inclusive, I have shown the lens sectors as having substantially undeformed lateral surfaces, for simplicity of illustration, it is within the contemplation of my invention that said surfaces may, if desired, be deformed as shown in my application above referred to, or as shown in Figs. 7-14 hereof, or in other ways, so as to act optically upon light falling thereon, i. e., to refract, reflect or diffract the light and produce any desired optical effect.

Referring now to the embodiments of Figs. 7 and 9, I show here another form of my invention with particular reference to the lens sector portion of the signalling device. Thus, the numeral 45 indicates a sector which may be generally similar to the sectors 12, $12^a$, $12^b$ except that one or more of its abutting surfaces 46 is deformed to provide a plurality of pyramidal projections, such as tetrahedrons, projecting from the generally vertical surface for the purpose of breaking up the light falling on this surface and reflecting it in a large number of directions in a dazzling or scintillating character. It should be understood that while I have shown one of the vertical surfaces as deformed and the other surface 47 as undeformed, both surfaces may, if desired, be deformed for the purposes indicated. Also, other types of prismatic or other deformations may be used.

Figs. 8 and 10 show a sector $45^a$ in which one or more of its abutting surfaces is deformed by providing a plurality of outwardly projecting nodules 49 which serve a similar purpose to the pyramids shown in Figs. 7 and 9.

Figs. 11-13 show another arrangement employing sectors 52 of transparent or translucent material which may be similar to the sectors employed in the other embodiments except that in this case one or more of their generally vertical surfaces are deformed to form vertically extending elongated prisms 53. Said sectors are mounted in a housing indicated generally by the numeral 55 and comprising a base portion 56 having preferably integrally formed therewith vertical lens separator walls 58. One or more of the walls 58 is preferably provided with perforations or windows 60 therein for the passage of light, and while I have shown these openings 60 as being spaced relatively close to the juncture of said walls 58 it will be understood that said openings or windows may, if desired, be spaced throughout the entire extent of said cross bars or at any desired intervals.

By reference to Fig. 12, it will be seen that a beam of light entering any of the sectors 52 will pass partly through the windows or passages 60 of the lens separators 58 so that a portion of said light will leave the signalling device in a direction transverse to the original beam and, thus, when the signalling device is mounted at an intersection of two or more highways or along a curve, a driver may be warned of the approach of a vehicle from a different direction and may reduce his speed accordingly. This applies especially, of course, to night driving. However, even in the day time, passage of sunlight from one sector to an opposite sector through the passages 60 will render the signals visible for long distances regardless of the position of the sun or direction of an approaching driver. The brilliant effect will be enhanced by use of multi-colored lens sections.

Referring to Fig. 14, I show here another modification of my invention comprising a plurality of transparent or translucent sectors 52ª which are mounted in a casing or housing, which may be generally similar to any of the forms of housing described hereinabove, such as, for example, those shown in Figs. 5, 6 or 11–13, with lens separator walls 58'. However, these walls 58' terminate short of the center, leaving a space therein in which may be mounted a translucent block 62 of glass or of one of the recently developed plastics having suitable properties, such as those sold under the names of "Lucite," "Tenite," etc. These parts may be secured together and to the base by a translucent cement or other suitable means.

The lens sectors 52ª may, as in the embodiment shown in Figs. 7–12, preferably have their generally vertical surfaces deformed from vertical planes to provide prisms or any other suitable light reflecting or refracting elements.

Obviously, a beam of light entering any sector 52ª will pass in part through the translucent or transparent center block 62, being bent or refracted so that it will enter the sector diagonally opposite the sector which the beam first entered. In said diagonally opposite sector the beam will again be refracted by the prism or other deformations 60 so that a portion thereof will leave said sector in a transverse direction from the original beam of light emanating from the source, such as an automobile headlight or the sun.

The advantage of this construction as well as that described above for Figs. 7–13 will be obvious. In both cases an automotive vehicle approaching an intersection in which a signalling device embodying my invention is placed, may transmit a signal along a transverse intersecting highway or around a curve. Thus, in a vehicle approaching the intersection on the transverse highway or approaching a curve, even though it may still be at a distance so great that light from its own headlights may not reach the signalling device, the driver thereof will be warned of the approach of a vehicle from another direction by observing the rays of its headlights transmitted through said signal device. Also, sunlight will pass through the center piece 62 and emitted from an opposite sector in a direction transverse to the path from the sun, being broken up by the deformations on the lens sectors so as to arrest attention and warn approaching traffic.

Semitransparent and reflecting coatings, such as light silvering or light coats of luminescent paint may be applied to the embodiments of Figs. 7–14, as indicated at 65.

Various changes coming within the spirit of my invention may suggest themselves to those skilled in the art, hence, I do not wish to be limited to the specific form shown or uses mentioned, except as indicated in the appended claims.

I claim:

1. In combination, a lens housing having means for anchoring it in pavement, and means for seating therein a plurality of wedge shaped lens elements, said seating means including a plurality of substantially vertical divider walls, and lens elements each having faces lying in generally vertical planes contiguous to said walls and a curved top surface, said elements having light deflecting deformations on said first-mentioned faces.

2. In combination, a highway safety signal comprising a protective housing adapted to be partially embedded in a road surface, and a plurality of lens segments supported in said housing, said segments each having a flat base, a substantially vertical face and a curved exposed upper surface, and means disposed between and contiguous to adjacent vertical faces of said segments for protecting the segments against lateral strain.

3. A combination as defined in claim 2, wherein the substantially vertical faces of the lens sectors are deformed so as to reflect light in a plurality of directions.

4. In combination, a highway safety signal comprising a plurality of solid segmento-spherical lenses each having a flat base and a pair of intersecting flat substantially vertical faces, said vertical faces providing surfaces reflecting light through said lenses, and supporting means for said lenses comprising a portion adapted to be embedded in a pavement and means for retaining said lenses in spaced relation, a major portion of the spherical surface of said lenses being substantially unobstructedly exposed at the top and sides of said signal.

5. A combination as defined in claim 4, wherein said housing comprises a platform and substantially vertical wall members disposed between and contiguous to the lenses.

6. A combination as defined in claim 5 wherein the wall members are perforated to permit passage of light therethrough from one lens to another, and the sectors are provided with deformations for reflecting a beam of light passing through said apertures at an angle transverse to said beam.

7. A combination as defined in claim 4, wherein the housing is an integral body having an anchoring portion and a portion engageable with the lenses above their bottom surfaces.

8. A combination as defined in claim 4, wherein the housing is an integral body comprising an anchoring portion, a flange portion adapted to seat on adjacent pavement, and a portion engageable with the lenses above their bottom surfaces.

9. A combination as defined in claim 8 wherein the housing also includes members overlying the lens sector separation planes.

10. A combination as defined in claim 4, wherein the housing also includes members overlying the lens sector separation planes.

11. A combination as defined in claim 4, wherein the housing is an integral body having an anchoring portion, a flange adapted to rest on the pavement surface, and substantially vertical lens spacing walls.

12. A combination as defined in claim 11, wherein said walls are perforated.

13. A combination as defined in claim 4, wherein said supporting means has substantially vertical wall members disposed between and contiguous to said lenses, said wall members each having a light passage therein, the vertical faces of said lenses having deformations for transmitting from said signal a portion of a beam falling thereon at a substantial angle to said beam and having light reflecting means applied to their generally vertical surfaces.

14. A combination as defined in claim 4, wherein said supporting means has substantially vertical wall members disposed between and contiguous to said lenses, said wall members each having a light passage therein, the vertical faces of said lenses having deformations for transmitting from said signal a portion of a beam falling thereon at a substantial angle to said beam, said lenses having a luminescent coating applied to their generally vertical surfaces.

SIDNEY H. PELLAR.

REFERENCES CITED

The following references are of record in the file of this patent:

UNITED STATES PATENTS

| Number | Name | Date |
|---|---|---|
| 1,698,957 | McCrea | Jan. 15, 1929 |
| 1,812,058 | Paul | June 30, 1931 |
| 1,927,756 | Ross | Sept. 19, 1933 |
| 2,067,698 | Hall | Jan. 12, 1937 |
| 2,301,185 | Arnold et al. | Nov. 10, 1942 |

FOREIGN PATENTS

| Number | Country | Date |
|---|---|---|
| 422,554 | Great Britain | Jan. 16, 1935 |